United States Patent [19]

Brouwers et al.

[11] Patent Number: 4,604,978
[45] Date of Patent: Aug. 12, 1986

[54] SPEED GOVERNOR FOR FUEL INJECTION PUMPS

[75] Inventors: Sytze Brouwers, Woodridge, Ill.; Werner Brühmann, Stuttgart; Heinz Kuschmierz, Gerlingen, both of Fed. Rep. of Germany

[73] Assignee: Robert Bosch GmbH, Stuttgart, Fed. Rep. of Germany

[21] Appl. No.: 713,719

[22] Filed: Mar. 19, 1985

[30] Foreign Application Priority Data

Oct. 26, 1984 [DE] Fed. Rep. of Germany ....... 3439277

[51] Int. Cl.$^4$ ............................................. F02D 1/04
[52] U.S. Cl. ..................................... 123/374; 123/369
[58] Field of Search ............... 123/373, 374, 369, 380, 123/379, 383

[56] References Cited

U.S. PATENT DOCUMENTS

| | | | |
|---|---|---|---|
| 3,620,199 | 11/1971 | Kuhn et al. | 123/374 |
| 4,054,112 | 10/1977 | Kurokawa et al. | 123/383 |
| 4,085,724 | 4/1978 | Djordjeric et al. | 123/374 |
| 4,164,925 | 8/1979 | Maier et al. | 123/374 |
| 4,192,272 | 3/1980 | Lang et al. | 123/374 |

FOREIGN PATENT DOCUMENTS

| | | | |
|---|---|---|---|
| 180177 | 11/1954 | Austria . | |
| 1961874 | 7/1970 | Fed. Rep. of Germany . | |
| 112425 | 9/1979 | Japan | 123/369 |
| 158523 | 12/1979 | Japan | 123/369 |
| 155318 | 12/1979 | Japan | 123/374 |
| 75554 | 6/1980 | Japan | 123/374 |
| 681122 | 10/1952 | United Kingdom | 123/374 |
| 1284408 | 8/1972 | United Kingdom . | |

Primary Examiner—Magdalen Y. C. Greenlief
Attorney, Agent, or Firm—Edwin E. Greigg

[57] ABSTRACT

A speed governor for fuel injection pumps is proposed having a guide shaft guided in a cam plate to serve as the pivot shaft for a governor lever connecting an adjusting member and a supply quantity control member. The guide shaft is adjustable and guided appropriately by means of an adjusting lever so far as to form a variable-speed governor adapted to varying the full-load and maximum rpm. The cam plate is adjustable by a device by means of an operating parameter acting independently of the speed governor, for instance, the engagement of a cruising or overdrive gear in a manual transmission. Upon rotation of the cam plate, the guide shaft is displaced by a movement-coupling member into a position in which a minimum idling rpm is assured.

12 Claims, 3 Drawing Figures

SPEED GOVERNOR FOR FUEL INJECTION PUMPS

BACKGROUND OF THE INVENTION

The invention is based on a speed governor as described hereinafter. In a known speed governor of this type (German Pat. No. 1 900 675 and U.S. Pat. No. 3,620,199), the guide shaft slides on one end in a guide slit disposed on the governor lever and on the other in a contoured path provided in the cam plate; the cam plate and the restoring spring embody a force reservoir in which the cam plate is lifted from a stationary stop, counter to the force of the spring, for example whenever the speed drops. As a result, the centrifugal adjuster pushes the governor lever out and the governor lever rests on an adaptation stop on the other end. This known adaptation is not mandatory for the basic function of this speed governor, however, the cam plate must be pivotable so as to act as a reservoir of motion. In contrast to this, in another known governor of otherwise the same generic type (Bosch—Technical Instruction—Fuel Injection Equipment for Diesel Engines (2), Governors for In-Line Pumps, 1st edition, Sept. 30, 1975, p. 20), the cam plate is secured in a fixed manner in the governor housing, and a drag spring perfoms the necessary motion storage.

For long-distance traveling, especially in long-distance trucks and buses, the goal is to keep wear to an absolute minimum, which is attainable by providing relatively low long-term rpm over these long distances. To accomplish this, it is known for the attainable maximum rpm of the engine in the highest gear ratio to be reduced (Austrian Pat. No. 180 177). This reduction of the rpm is effected solely by decreasing the biasing of the governor spring, so that even at relatively low engine speeds, breakaway control of fuel quantity is effected by means of the centrifugal adjuster. This varies the performance range of the governor, that is, the control path of the spring, which impairs the governing quality. The result is a corresponding reduction in the idling rpm; this has a particularly unfavorable effect if, in order to reduce fuel consumption, the idling rpm has already been designed to be at the running limit, that is, as low as possible, in the previous gear.

The application upon which this application claims priority was filed in the Federal Republic of Germany first based upon License No. 459,441 dated May 24, 1983.

OBJECT AND SUMMARY OF THE INVENTION

The speed governor according to the invention has the advantage over the prior art that regardless of the position of the cam plate, the output capacity of the speed governor is fully exploitable. By means of the displacement of the guide shaft, in conjunction with the pivoting of the cam plate, only the controlled full-load rpm fed to the governor is reduced in proportion, but in the full-load position of the adjusting lever the established full-load injection quantity remains unchanged. Advantageously, none of the other control operations in such a governor, which are extraordinarily complicated and are the result of trial-and-error compromises, are disadvantageously affected, and furthermore a governor which is already produced on a large scale can be used to realize the invention, needing merely to have the device for the intervention of the operating characteristic added.

In an advantageous embodiment of the invention, this device has a biased spring, which adjusts the cam plate, before the operating characteristic comes into play, into a position for a lower maximum rpm and which itself is taken out of action under the influence of the operating characteristic. As a result, it is advantageously attained that if the device fails technically, the engine can only be driven with the reduced maximum rpm, and the driver is compelled, for safety reasons as well, to repair the inoperative system. For instance, if the system is a pneumatic control, where in accordance with the invention the device operates with a working cylinder the piston rod of which at least indirectly engages the cam plate and in particular the biased spring is disposed in the working cylinder and urges the piston in the projected direction, then if the compressed air and hence the brake system should fail, the maximum speed is automatically reduced as well.

According to a further embodiment of the invention, a coupled-movement element prevents the supply quantity adjusting member from being displaced into a position in which the metered fuel quantity no longer suffices to maintain a minimum rpm. By means of the parallel displacement of the governor characteristics attainable by means of the governor according to the invention, the idling rpm too is reduced. The coupled-movement element prevents the rpm from undesirably falling below the minimum rpm. In accordance with the invention, a rotatable stop plate can serve as the coupled-movement element, the position of which is variable by means of the cam plate. As soon as the can plate assumes a position for reduced rpm, the pivoting range of the adjusting lever too is restricted, via the stop plate, such that it is incapable of assuming a position in which the rpm could drop below the required idling rpm.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
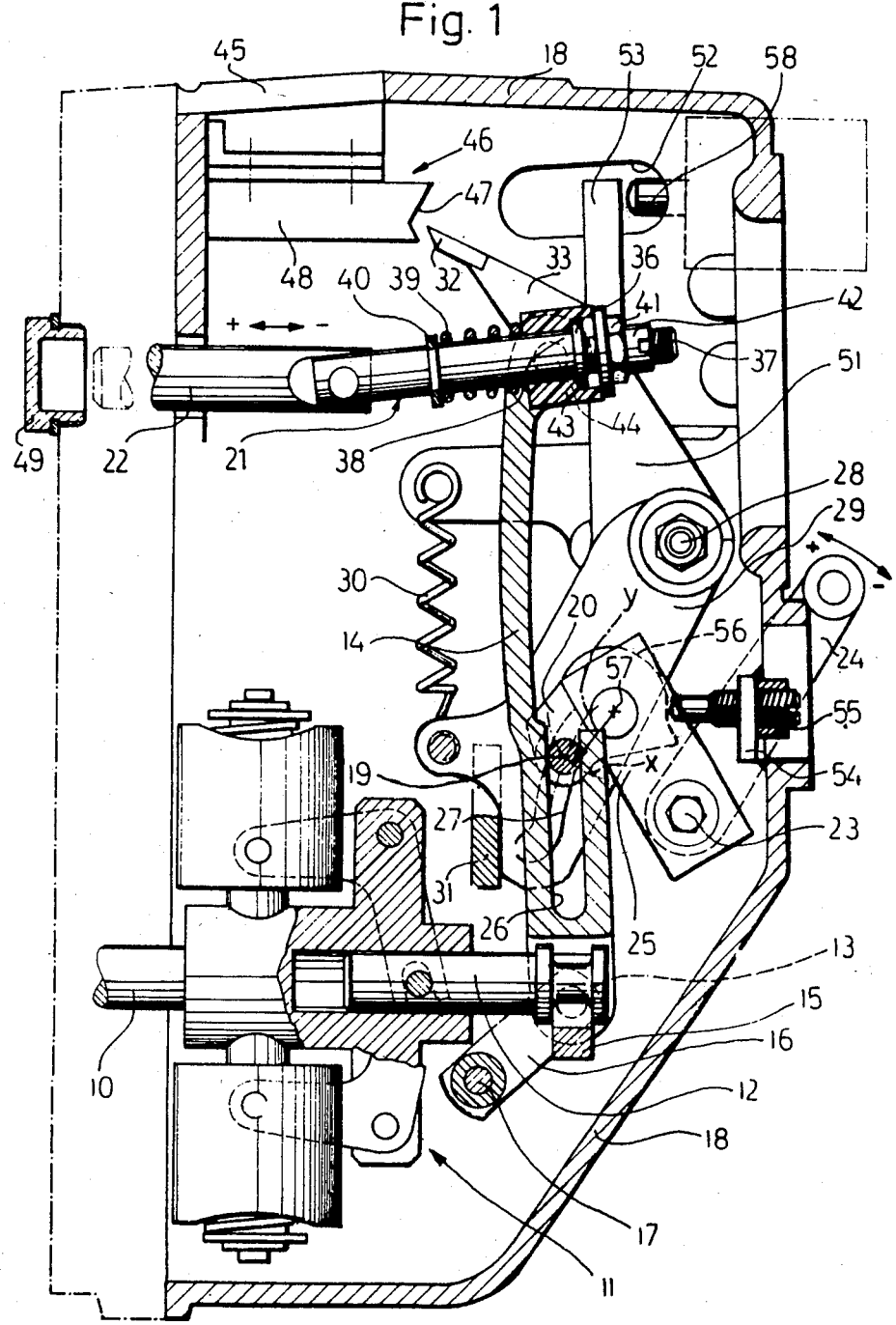
FIG. 1 is a longitudinal cross sectional view taken through a variable-speed governor.

A centrifugal adjuster 11 is secured on the drive shaft 10 of an injection pump, for internal combustion engines, with this shaft being shown as a stub portion in the drawing. The governor sleeve 12 of this adjuster 11, which serves as the adjusting member, engages a governor lever 14 via a pin 13. The pin 13, attached laterally on a slide member 15, is connected in an articulated manner to guide lever 16, which in turn is pivotably supported by means of a pin 17 in a housing 18 encompassing the entire governor.

The movements of the governor sleeve 12 are transmitted via the governor lever 14, which is supported on a guide shaft or pin 19 of an intermediate lever 20, and via an articulated fork 12 to a governor rod 22, which embodies the supply quantity control member of the injection pump. On a shaft 23 that is pivotable in the housing 18, the intermediate lever 20 is articulated in a crank-like manner with an actuating lever 25 joined to an operator lever 24 located outside the governor housing 18.

With one end, the guide shaft 19 that is firmly joined to the intermediate lever 20 of the actuating lever 25 engages a guide slit 26 on the governor lever 14 and with its other end it engages a contoured path 27. This contoured path 27 is machined into a cam plate 29 that is pivotably supported on a pin 28 integral with the housing. In the outset position, by the force of a helical spring 30, the cam plate 29 rests on a stop 31 which is also integral with the housing.

A rocker 33 provided with a feeler protrusion 32 is pivotably connected at the point of articulation of the governor lever 14 with the intermediate link 21. By means not shown, the rocker can be adjusted and fixed counter to a spring that fixes the adjusted position.

For purposes of fine adjustment of the spacing between the governor rod 22 and the governor lever 14, or the feeler protrusion 32, the intermediate link 21 articulatedly connected to the governor lever 14 is provided with a device which comprises one bolt-like end 38 of the intermediate link 21, a spring 39, two nuts 41 and 42, and an articulated part 43. The end of bolt 38 is also provided with a collar 36 and a threaded portion 37 to receive the two nuts. The articulated part 43 is supported in the governor lever 14 by two lateral pins 44 which at the same time support the rocker 33, and by the force of the spring 39 the articulated part 43 is pressed against the one end face of the nut 41 secured by the check nut 42, the spring 39 being supported on a snap ring 40.

Access to a stop 46 which limits the full-load supply quantity of the injection pump is gained via a closable opening 45 provided at the top of the housing 18. The lever-like stop plate 48 of the stop 46 is provided with a curve 47 and is arranged to cooperate with the protrusion 32 of the rocker 33. This stop has adjusting members which are known in the prior art and is shown here merely in simplified form.

Limiting the maximum fuel quantity required during starting is accomplished by a limiting stop 49 that is threaded onto the drive side of the pump in an extension of the governor shaft axis.

According to the invention, an upstanding lever arm 51 is associated with the top of the cam plate 29. The upper end 53 of this lever arm 51 is accessible via an opening 52 in the housing 18 and is engaged by a device 58, only schematically shown in the drawing, for pivoting the cam plate 29.

A stop screw 55 for the intermediate lever 20 is provided in a threaded tab 54 which is integral with the housing. One end edge 56 of the intermediate lever oriented toward the stop screw 55 is contoured in this region with respect to a pivot shaft 57, with which the intermediate lever 20 is articulated on the steering lever 25 and thus serves as a movement-coupling member for correcting the idling setting.

The governor described above functions as follows (the arrows shown indicate the directions of adjustment, with + representing the adjusting direction for an increasing injection quantity and − representing the adjusting direction for decreasing fuel quantity):

The parts of the governor are shown in the idling position. When the engine is started, the adjusting lever 24 is moved in the + direction until it is in the full-load position, in the course of which the governor rod 22 is pushed into the starting position via the steering lever 25 and intermediate lever 20, the governor lever 14 and the articulated fork 21 while at the same time the governor lever 14 is pivoted about the sliding pin 13; and the feeler protrusion 32 is moved to a position below the curve 49. This adjusting movement is limited by the arrival of the governor rod 22 against the stop 49.

Once the engine has turned over and the operator lever 24 is for instance kept in the full-load position, the rpm increases further, and the governor sleeve 12 of the centrifugal adjuster 11 moves in the direction toward the pump and thereby moves the slide member 15 along with it. As a result, in addition to the longitudinal movement in the axial direction, the pin 13, guided by the guide lever 16, experiences a reciprocating movement transverse to this longitudinal movement, so that the governor lever 14 is pivoted about the pin 19 such that the governor rod 22 is pulled in the − direction, to reduce the fuel supply quantity. As the engine thus runs up to speed, the feeler protrusion 32 positioned under the stop plate 48 is guided resiliently upward once again by means of the resilient rocker 33.

The reduction of the injection quantity causes the engine rpm to drop, so that the slide member 15 is moved back away from the pump into a position corresponding to the established full-load position of the adjusting lever 24. In this position of the slide member 15, the feeler protrusion 32 strikes the curve 47.

If the rpm drops for a predetermined, i.e., preselected position of the operator lever 24 as a result of an increased load on the engine, then the governor lever 14 is pivoted about the guide shaft or pin 19 via the centrifugal adjuster 11 such that the governor rod 22 is displaced in the + direction until such time as the feeler protrusion 32 strikes the stop 46. Contrarily, if the rpm increases again with reduced load on the engine, then the governor rod is conversely moved in the − direction.

Now if the operator lever 24 is displaced into some other set-point rpm position, then the guide shaft or pin 19 is also displaced in the contoured path 27 of the cam plate 29, and the rotational point of the governor lever 14, which is defined by the guide shaft 19, is accordingly displaced. For this new rotational point, which for instance is at a lower position for a higher rpm, a separate rpm range from idling rpm up to full-load rpm is the result. The difference is merely in that the maximum rpm is different, depending upon the position of the operator lever 24. The adjustment of the guide shaft 19 here takes place along the curve y determined by the contoured path 27.

Now if the end 53 of the lever arm 51 is acted upon because the engine has been shifted into some gear, causing the cam plate 29 to pivot downward toward the right, then the guide shaft 19 would be carried along on the circular path x, causing the pivot point of the governor lever 14 to shift toward the right and thereby reduce the injection quantity by the corresponding pulling along of the governor rod 22 in the − direction. To prevent a resultant failure to provide the minimum injection quantity required for stable idling, the pivot shaft 57 of the intermediate lever 20 is pivoted counterclockwise to the left by means of the curved end edge 56, which is supported on the stop screw 55, of the intermediate lever; as a result, the guide shaft 19 is displaced further downward in the contoured path 27 and in the guide slit 26. Because of the coupling with respect to the operator lever 24, this lever 24 is rotated as well. As explained above, the rpm range corresponding to a particular adjusting lever position is inherently higher, the farther downward the guide shaft 19 is displaced; however, if the contoured path 27 is shifted into a position for a low maximum rpm, then thanks to the above-described correction only the idling rpm is corrected, so the injection quantity does not fall below the minimum idling quantity.

The adjustment of the cam plate 29 can naturally be effected instead via the lever arm 51, by displacing the stop 31.

Figure 2:
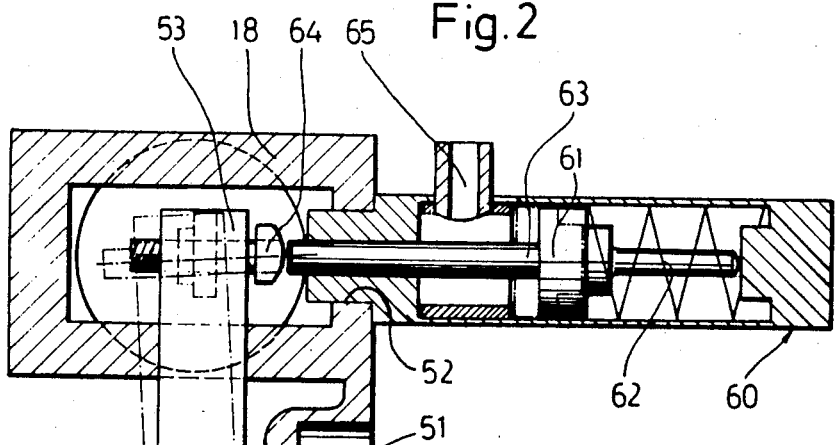
FIG. 2 is a corresponding fragmentary cross sectional view taken through another exemplary embodiment.

In the second exemplary embodiment shown in FIG. 2, the governor is fundamentally embodied as in the first exemplary embodiment shown in FIG. 1. Therefore only those elements differing from the first embodiment are shown, and corresponding elements have the same reference numerals.

A pneumatic cylinder 60 is disposed on the housing 18 in the vicinity of the opening 52, its piston 61 being urged by a biased spring 62 in the direction of extension, i.e., to the left as viewed in the drawing. With its end 64, the piston rod 63 acts upon the end 53 of the lever arm 51. The pneumatic cylinder 61 has a compressed air connection 65, which when the vehicle is being driven in the lower gears is supplied with compressed air, so that the piston assumes the position indicated by solid lines.

As soon as the cruising gear of the manual transmission has been engaged, the pressure in the connection 65 is reduced, so that the biased spring 62 displaces the piston 61 and the piston rod 63 into the position shown in dashed lines. The cam plate 29 is thereupon pivoted about the pin 28 as well, so that the contoured path 27 and thus the guide shaft 19 are also displaced into the position indicated by dot-dash lines.

Serving here as a stop member for coupling the steering lever 25 and thus the guide shaft 19, via the pivot shaft 57 and the intermediate lever 20, is a stop plate 66 which is rotatable on the shaft 23. The lower end 67 of the stop plate 66 cooperates with the cam plate 29 and is carried along with it when the latter moves. At the upper end 68 of this stop plate 66, there is an adjusting screw 69 which is arranged to cooperate with the actuating lever 25. Upon the rotation of the stop plate 66, this adjusting screw 69 carries the actuating lever 25 along, causing the guide shaft 19 to undergo the displacement into the position indicated by dot-dash lines. The adjusting screw 69 is positioned in a thread of a bent tab 70 of the stop plate 66. An adjustment of this adjusting screw 69 is possible only if a cap 71 is removed from the housing 18.

Even if the actuating lever 25 were rotated by the operator lever 24 (not shown here) via the shaft 23 so forcefully that the cam plate 29 were rotated back against the stop 31 via the end 67 of the stop plate 66, this would not have any critical consequences for the governing process, because the guide shaft 19 would simultaneously be displaced into the position indicated by solid lines, corresponding for instance to in-town driving. In any case, however, in the event that the compressed air fails the cam plate 29 is rotated into the position indicated by dot-dash lines, corresponding to a low maximum rpm, thereby making the driver aware of this failure.

Figure 3:
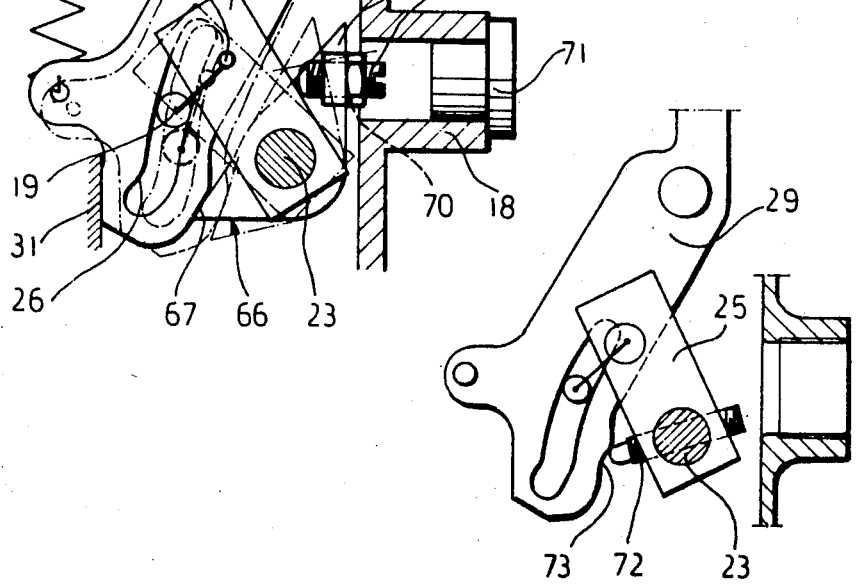
FIG. 3 is a variant of the embodiment shown in FIG. 1 or FIG. 2.

In the third exemplary embodiment shown in FIG. 3, a stop screw 72 is provided as the movement-coupling member of the actuating lever 25 when the cam plate 29 rotates. This stop screw 72 is secured in a bore of the shaft 23 and cooperates directly with a curve 73 of an end edge of the cam plate 29, which is associated with this top screw 72. This curve 73 is embodied such that upon rotation of the cam plate 29, the actuating lever 25 is pivoted along with it as desired.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A speed governor for fuel injection pumps for internal combustion engines including a housing, comprising a rpm-dependent adjusting member which is joined to a supply quantity control member via a governor lever pivotable about a guide shaft, said guide shaft being displaceable by an arbitrarily actuatable adjusting lever along said governor lever to vary the speed droop of said governor and to preselect the rpm to be governed, said guide shaft being displaceable along a curve of a cam plate that is retainable in a basic position by a spring, said cam plate being pivotable about a pin integral with said housing, said guide shaft further being displaceable into a position assuring a minimum idling rpm by means of a movement-coupling member upon adjustment of said cam plate to produce a lower maximum rpm, said movement-coupling member further including a stop plate, said stop plate being disposed on a shaft of said adjusting lever parallel to said cam plate, and means for reducing the full-load and maximum rpm by swiveling said cam plate counter to the force of the said spring in accordance with an operating parameter acting independently of the rpm governor.

2. A speed governor as defined by claim 1, further wherein said internal combustion engine is disposed in a motor vehicle driving a transmission provided therein and said operating parameter comprises a signal generated by a signal generating means upon engagement of a chosen gear in said transmission.

3. A speed governor as defined by claim 2, further wherein said signal serves to control said speed governor by limiting selectively the rpm attainable by said engine in accordance with a predetermined limit for the chosen gear.

4. A speed governor as defined by claim 1, further wherein said means includes a biased spring arranged to overcome said first named spring and further that said biased spring can be disengaged by means of the effect of said operating parameter.

5. A speed governor as defined by claim 4, wherein said means further includes a preferably compressed-air-actuated working cylinder provided with a piston and a piston rod, said piston rod arranged to at least indirectly engage said cam plate.

6. A speed governor as defined by claim 5, further wherein said biased spring urges said piston in an extended direction in said working cylinder.

7. A speed governor as defined by claim 1, further wherein said stop plate is rotatable on said shaft with the range of rotation thereof being limited by means of an adjusting screw affixed to said stop plate and arranged to cooperate at least indirectly with said adjusting lever.

8. A speed governor for fuel injection pumps for internal combustion engines including a housing, comprising a rpm-dependent adjusting member which is joined to a supply quantity control member via a governor lever pivotable about a guide shaft, said guide shaft being displaceable by an arbitrarily actuatable adjusting lever along said governor lever to vary the speed droop of said governor and to preselect the rpm to be governed, said shaft being displaceable along a curve of a cam plate that is retainable in a basic position by a spring, said cam plate being pivotable about a pin integral with said housing, said guide shaft further being displaceable into a position assuring a minimum idling rpm by means of a movement-coupling member upon adjustment of said cam plate to produce a lower maximum rpm, said movement-coupling member further including an intermediate lever articulated on said adjusting lever, said intermediate lever being arranged to cooperate with a stop means and to bear said guide shaft, and means for reducing the full-load and maximum rpm by swiveling said cam plate counter to the force of the said spring in accordance with an operating parameter acting independently of the rpm governor.

9. A speed governor for fuel injection pumps for internal combustion engines including a housing, comprising a rpm-dependent adjusting member which is joined to a supply quantity control member via a governor lever pivotable about a guide shaft, said guide shaft being displaceable by an artitrarily actuatable adjusting lever along said governor lever to vary the speed droop of said governor and to preselect the rpm to be governed, said guide shaft being displaceable along a curve of a cam plate that is retainable in a basic position by a spring, said cam plate being pivotable about a pin integral with said housing, said guide shaft further being displaceable into a position assuring a minimum idling rpm by means of a movement-coupling member upon adjustment of said cam plate to produce a lower maximum rpm, said movement-coupling member further including a stop means affixed to and rotatable with a shaft of said adjusting lever, said stop means further being arranged to cooperate with a means defined by a curved area provided on an edge of said cam plate, and means for reducing the full-load and maximum rpm by swiveling said cam plate counter to the force of the said spring in accordance with an operating parameter acting independently of the rpm governor.

10. A speed governor as defined by claim 8, further wherein said stop means further includes adjusting means.

11. A speed governor as defined by claim 9, further wherein said shaft includes a transverse bore and said stop means is positioned in said bore.

12. A speed governor as defined by claim 11, further wherein each said bore and stop means are provided with threads.

* * * * *